Nov. 30, 1971  R. P. BENEDICT  3,623,367
APPARATUS FOR MEASURING THE AVERAGE TEMPERATURE OF A GAS STREAM
Filed Dec. 23, 1969
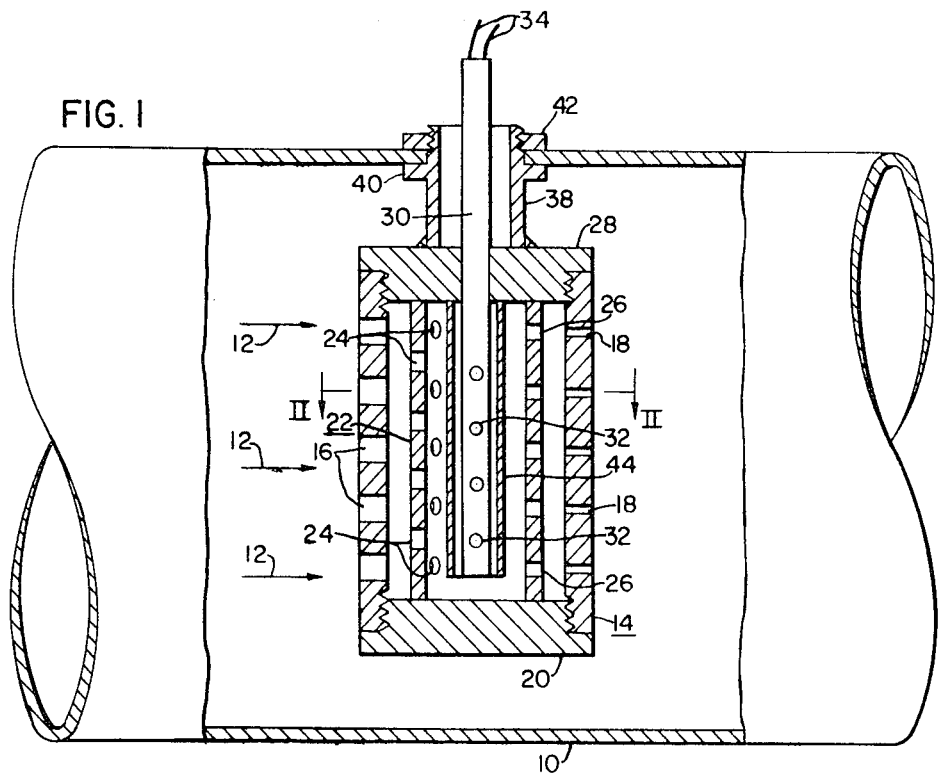
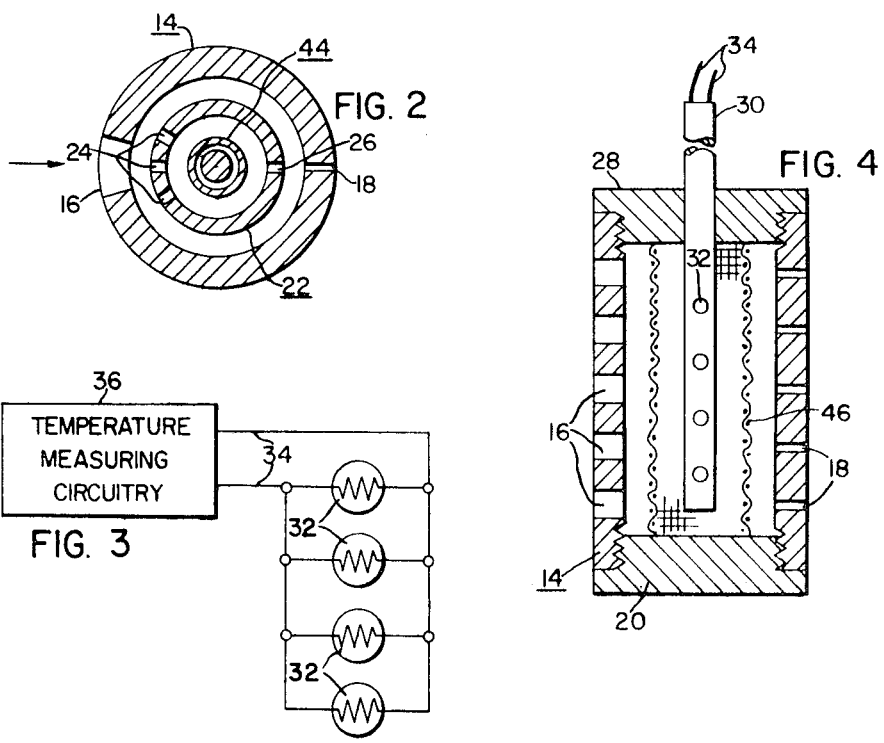

3,623,367
APPARATUS FOR MEASURING THE AVERAGE
TEMPERATURE OF A GAS STREAM
Robert P. Benedict, Media, Pa., assignor to Westinghouse
Electric Corporation, Pittsburgh, Pa.
Filed Dec. 23, 1969, Ser. No. 887,683
Int. Cl. G01k 3/06, 13/02
U.S. Cl. 73—340                                8 Claims

ABSTRACT OF THE DISCLOSURE

Apparatus for measuring the average temperature of a hot gas stream, such as a combustion gas stream, having a temperature gradient across the stream at right angles to its direction of flow. The apparatus includes a probe, adapted to be placed in the gas stream, which has inner and outer apertured chambers for mixing gas samples across the gas stream. The inner chamber contains temperature sensing means, preferably a plurality of parallel-connected electrical temperature sensing devices disposed within a temperature-averaging sleeve. In this manner, fluid samples across the gas stream are mixed before a temperature measurement is taken and serve to heat the sleeve to a uniform temperature. At the same time, the walls of the chambers serve as a radiation and conduction shield for the temperature measuring means such that the true average temperature of the gas stream can be measured without interference from cold walls, luminescent flames and the like.

BACKGROUND OF THE INVENTION

As is known, temperature gradients exist in a passage whenever a fluid flows. Designers base performance of fluid actuated apparatus, such as turbines, on some average temperature. Presently, the average temperature in a duct is obtained by spacing a multiplicity of individual thermocouples across the passage and arithmetically averaging the temperature which correspond to the various point outputs. Such is the case, for example, when attempting to obtain average temperatures at inlets and exits of combustors and turbines, in exhaust hoods and stacks, in a variety of piping, and in heat transfer apparatus.

The difficulty with prior art methods utilizing spaced thermocouples is that the temperature gradients in a high temperature, high velocity fluid are often quite severe, amounting to several hundreds of degrees in some gas turbine components. This presents a serious problem because a result biased by hot or cold spots will naturally yield a thermodynamic performance which is erroneous. The average temperatures obtained in this manner are further biased by radiation and conduction effects at the sensors and by poor dynamic recoveries.

SUMMARY OF THE INVENTION

In accordance with the present invention, a device is provided which effectively derives the average temperature of a high temperature, high velocity gas stream by mixing gas samples across a temperature gradient in the flowing gas stream before a temperature measurement is taken. In the preferred embodiment of the invention, many gas samples are obtained through ports in an outer jacket of a probe in the path of a flow of fluid, this outer jacket serving as a structural member, a radiation and conduction shield, and a partial mixing chamber. From the outer mixing chamber, a portion of the partially mixed sample is drawn through ports into an inner chamber where it is further mixed and isolated from the surrounding main gas flow as well as from conduction and radiation effects. Finally, a number of very small temperature pickups are located within the inner chamber; and these electrically average the point temperatures experienced. Additional ports are provided in the inner and outer chambers to insure a constant but gradual flow of mixed gases through the chambers. The device exhibits freedom from radiation and conduction effects, high dynamic temperature recovery, rapid temperature response, and thus provides a unique multiply-averaged gas temperature.

In one embodiment of the invention shown herein, the inner chamber containing the temperature measuring elements is formed from a sleeve having ports formed in the walls thereof. In another embodiment of the invention, the inner chamber is formed by means of a cylindrical element formed from wire gauze or a wire screen which permits gases to enter the inner chamber while acting as a baffle to the same. Preferably, the temperature measuring elements are carried, in the inner chamber, within a thin, highly conducting sleeve which further averages the gas temperature. The temperature measuring elements can be either thermocouples or thermistors connected in parallel to suitable temperature measuring circuitry; although in certain cases a single temperature measuring element can be used, depending upon requirements.

The above and other objects and features of the invention will become apparent from the following detailed description taken in connection with the accompanying drawings which form a part of this specification of an exemplary form of the invention, and in which:

DESCRIPTION OF THE PREFERRED EMBODIMENTS

FIG. 1 is a cross-sectional view of one embodiment of the invention inserted into a conduit carrying a stream of heated gas;

FIG. 2 is a cross-sectional view taken substantially along line II—II of FIG. 1;

FIG. 3 is a schematic circuit diagram showing the manner in which the temperature measuring elements of the embodiment of FIG. 1 are connected to suitable temperature measuring circuitry; and FIG. 4 is a cross-sectional view of an alternative embodiment of the invention wherein the inner mixing chamber is formed by means of a cylinder formed from wire gauze or a screen.

With reference now to the drawings, and particularly to FIG. 1, a conduit 10 is shown through which a stream of high velocity gas flows in the direction of arrows 12. This conduit may, for example, be a steam conduit, a connection to the inlet or outlet of a combustor or turbine, or used in any other heat transfer application. As was explained above, a temperature gradient will exist across the diameter of the conduit 10. This temperature gradient exists whenever a fluid flows. The probe apparatus of the present invention is designed to obtain an average temperature of the gas flowing through the conduit 10. As shown in FIGS. 1 and 2, it comprises an outer cylindrical sampling jacket 14 having elongated openings 16 in its side wall facing the gas stream 12 and bleed holes 18 on its opposite side. Threaded into the bottom of the jacket 14 is a cap 20 having an inner cylindrical mixing chamber 22 welded or otherwise securely fastened thereto. The inner mixing chamber 22 is also provided with a plurality of openings 24 adjacent the openings 16 in the sampling jacket 14, and bleed holes 26 adjacent the bleed holes 18 in the jacket 14.

Threaded into the other end of the sampling jacket 14 is a second cap 28 which carries an insert 30 extending down into the cylindrical mixing chamber 22. The insert 30, which is preferably formed from insulating material such as a plastic or ceramic, carries a plurality of temperature sensors 32 connected through leads 34 to suitable temperature measuring circuitry.

The temperature measuring circuitry is shown in block form in FIG. 3 and identified by the reference numeral 36. It is connected through the leads 34 to four temperature sensors 32 which, in the embodiment of the invention shown in FIG. 3, comprises four thermistors connected in parallel; however four thermocouples or other similar temperature measuring devices could be used equally well. By virtue of the fact that the temperature measuring devices 32 are connected in parallel, the current flowing through leads 34 will be a function of the average effect of the temperature measuring devices 32. Assuming that the temperature measuring devices 32 are thermistors, they may be connected in one leg of a bridge circuit to indicate the actual average temperature of the gas flowing through the conduit 10.

The cap 28 is provided with an extension 38 which fits through an opening in the side wall of conduit 10 and is secured thereto by means of a flange 40 and a suitable nut 42; however it will be understood that other and different types of supports may be provided, depending upon requirements.

In the embodiment of the invention shown in FIG. 1, the temperature measuring insert 30, adjacent the temperature measuring devices 32, is surrounded by a thin, highly conductive, temperature-averaging sleeve 44 secured to the underside of the cap 28. With this arrangement, the temperature sensors 32, in effect, measure the temperature of the sleeve 44 which, in turn, is dependent upon the temperature of the surrounding gases within the mixing chamber 22. Hence, the sleeve 44 provides a further temperature-averaging effect. In certain cases, however, the sleeve 44 may be omitted.

As will be appreciated, the sampling jacket 14 supports the inner mixing chamber 22 and the insert 30 and also shields the temperature measuring devices 32 from radiation and conduction effects by cutting them off from any view of cold walls, luminescent flames and the like. At the same time, the gases, as they enter the sampling jacket 14, will enter a zone where they are at least partially mixed. The exit bleed holes 18 maintain the sample current by insuring a flow through the sampling jacket, thus contributing to the fast response of the device. As the gases enter the mixing chamber 22, they are further mixed and then engage the sleeve 44 to heat the same. At this point, therefore, the sleeve, whose temperature is actually measured by the devices 32, has a temperature which is the average of the temperature gradients existing across the conduit 10.

In FIG. 4, another embodiment of the invention is shown wherein elements corresponding to those shown in FIG. 1 are identified by like reference numerals. In this case, however, the inner mixing chamber 22 is replaced by a cylinder 46 formed from wire gauze material. The action of the wire gauze cylinder 46, is of course, similar to the mixing chamber 22, the gases within the cylinder being in a more or less thoroughly mixed, quiescent state. However, these mixed gases are constantly replaced by virtue of the bleed holes 18.

As will be understood, the apparatus of the invention can effectively separate and measure the gas temperature in a two-phase flowing stream. The device has a high dynamic temperature recovery which means that the average temperature is very nearly the required total temperature of the gas.

I claim as my invention:

1. A probe for measuring the average temperature existing across a flow of hot fluid at right angles to its direction of flow, comprising a chamber disposed in said flow of fluid and having openings therein which permit samples of said flow of fluid to enter said chamber and become mixed, a plurality of electrical temperature sensing devices spaced within said chamber, temperature indicating circuitry, and means connecting said temperature indicating circuitry, and means connecting said temperature sensing devices to said temperature indicating circuitry, whereby the signals across said devices will be averaged and the temperature indicated by said indicating circuitry will be the average of those sensed by said sensing devices, said temperature sensing devices being carried on a member extending into said chamber, and including a temperature-averaging sleeve surrounding said member and the temperature sensing devices carried thereby, said sleeve being formed from material having high heat conductivity characteristics.

2. The probe of claim 12 wherein said temperature sensing devices are connected in parallel to said temperature indicating circuitry.

3. The probe of claim 12 wherein said chamber is formed from material which isolates said temperature sensing devices from external radiation and conduction effects.

4. The probe of claim 12 wherein said chamber is formed from wire gauze material.

5. The probe of claim 1 including a second chamber surrounding said first-mentioned chamber, said second chamber having openings therein which permit samples of said flow of fluid to enter said second chamber and become at least partially mixed before entering said first-mentioned chamber.

6. A probe for measuring the average temperature existing across a flow of fluid at right angles to its direction of flow, comprising a first chamber disposed in said flow of fluid and having openings therein which permit samples of said flow of fluid to enter said chamber and become at least partially mixed, a second chamber disposed within said first chamber and having a plurality of openings therein which permit fluid from said first chamber to enter said second chamber, electrical temperature sensing means carried within said second chamber, means connecting said temperature sensing means to temperature indicating circuitry, said temperature sensing means comprising a plurality of temperature sensing devices connected to said temperature indicating circuitry, whereby the signals across said devices will be averaged and the temperature indicated by said indicating circuitry will be the average of those sensed by said sensing devices, and a temperature-averaging sleeve surrounding said temperature sensing devices, said temperature-averaging sleeve being formed from material of good heat conductivity characteristics.

7. The probe of claim 6 wherein said openings in said first and second chambers have axes extending generally parallel to the direction of fluid flow, and including openings on the opposite sides of said chambers for bleeding fluid therefrom.

8. The probe of claim 6 wherein said second chamber is formed from wire gauze material.

References Cited

UNITED STATES PATENTS

| | | | |
|---|---|---|---|
| 2,289,908 | 7/1942 | Gorton | 73—349 |
| 2,875,613 | 3/1959 | Neal | 73—341 |
| 3,393,101 | 7/1968 | Kirkpatrick | 136—231 X |
| 3,509,768 | 5/1970 | Reynolds | 73—349 X |

FOREIGN PATENTS

| | | | |
|---|---|---|---|
| 734,702 | 8/1955 | Great Britain | 73—349 |

LOUIS R. PRINCE, Primary Examiner

D. E. CORR, Assistant Examiner

U.S. Cl. X.R.

73—349